(12) United States Patent
Lyell et al.

(10) Patent No.: US 12,053,123 B2
(45) Date of Patent: Aug. 6, 2024

(54) ADJUSTABLE BLADE ASSEMBLY FOR A FOOD PROCESSOR

(71) Applicant: SharkNinja Operating LLC, Needham, MA (US)

(72) Inventors: Nathan Lyell, Woking (GB); Sam William Bannister, Kent (GB)

(73) Assignee: SharkNinja Operating LLC, Needham, MA (US)

( * ) Notice: Subject to any disclaimer, the term of this patent is extended or adjusted under 35 U.S.C. 154(b) by 339 days.

(21) Appl. No.: 17/684,508

(22) Filed: Mar. 2, 2022

(65) Prior Publication Data
US 2023/0276995 A1    Sep. 7, 2023

(51) Int. Cl.
*A47J 43/07* (2006.01)
*A47J 43/046* (2006.01)
*A47J 43/08* (2006.01)

(52) U.S. Cl.
CPC ......... *A47J 43/0722* (2013.01); *A47J 43/046* (2013.01); *A47J 43/0727* (2013.01); *A47J 43/085* (2013.01)

(58) Field of Classification Search
CPC ........ B26D 1/0006; B26D 1/29; B26D 3/225; A47J 43/0722; A47J 43/046; A47J 43/0727; A47J 43/085
See application file for complete search history.

(56) References Cited

U.S. PATENT DOCUMENTS

| | | | |
|---|---|---|---|
| 3,623,525 A | 11/1971 | Kieves | |
| 3,784,118 A | 1/1974 | Hurwitz | |
| 4,283,979 A | 8/1981 | Rakocy et al. | |
| 4,364,525 A | 12/1982 | McClean | |
| 4,560,111 A | 12/1985 | Cavalli | |
| 4,877,191 A | 10/1989 | Golob et al. | |
| 8,439,285 B2 | 5/2013 | Beber et al. | |
| 8,602,335 B2 | 12/2013 | Krasznai | |

(Continued)

FOREIGN PATENT DOCUMENTS

| | | |
|---|---|---|
| CN | 2095623 U | 2/1992 |
| CN | 2413874 Y | 1/2001 |

(Continued)

OTHER PUBLICATIONS

International Search Report and Written Opinion in Application No. PCT/US2022/037969, dated Nov. 30, 2022 (12 pgs.).

*Primary Examiner* — Jennifer S Matthews
(74) *Attorney, Agent, or Firm* — The Webb Law Firm

(57) ABSTRACT

An adjustable blade assembly includes a threaded hub coupleable to a drive shaft of a food processor and a slicing plate slidably mounted on the hub. A slicing blade couples to the hub above a first surface of the slicing plate for cutting food introduced into the food processor. A cannulated support collar couples to the hub and includes a plurality of detents. A slicing adjustment sleeve rotatably couples to the hub and to the support collar to move the slicing plate up and down relative to the hub, thus changing a selected distance between the slicing plate and the slicing blade. As the user rotates the slicing adjustment sleeve, a plunger housed inside the slicing adjustment sleeve engages the plurality of detents on the support collar, thus providing tactile feedback to the user and maintaining the slicing blade in the desired position relative to the slicing plate.

20 Claims, 7 Drawing Sheets

(56) References Cited

U.S. PATENT DOCUMENTS

| | | |
|---|---|---|
| 8,671,832 B2 | 3/2014 | Beber et al. |
| 8,720,325 B2 | 5/2014 | Goncalves et al. |
| 8,777,140 B2 | 7/2014 | Beber et al. |
| 8,814,072 B2 | 8/2014 | Gushwa |
| 8,899,504 B2 | 12/2014 | Gushwa |
| 8,905,342 B2 | 12/2014 | Gushwa |
| 8,944,357 B2 | 2/2015 | Conti et al. |
| 9,049,965 B2 | 6/2015 | Beber et al. |
| 9,351,610 B2 | 5/2016 | Wang et al. |
| 9,386,884 B2 | 7/2016 | Armstrong et al. |
| 9,572,458 B2 | 2/2017 | Conti |
| 9,655,474 B2 | 5/2017 | Beber et al. |
| 9,763,469 B2 | 9/2017 | Cheung et al. |
| 9,770,135 B2 | 9/2017 | Hensel et al. |
| 10,105,864 B2 | 10/2018 | Goncalves et al. |
| 10,427,316 B2 | 10/2019 | Beber et al. |
| 10,449,685 B2 | 10/2019 | Beber et al. |
| 10,537,209 B2 | 1/2020 | Hensel et al. |
| 10,582,808 B2 | 3/2020 | Beber et al. |
| 11,007,664 B2 | 5/2021 | Beber et al. |
| 11,325,274 B1 * | 5/2022 | Leung .................. B26D 7/2614 |
| 2007/0158478 A1 | 7/2007 | Stager |
| 2013/0233954 A1 | 9/2013 | Berber et al. |
| 2014/0061344 A1 | 3/2014 | Conti et al. |
| 2014/0077012 A1 | 3/2014 | Berber et al. |
| 2017/0080592 A1 * | 3/2017 | Beber .................. B26D 7/2614 |
| 2021/0237303 A1 | 8/2021 | Beber et al. |

FOREIGN PATENT DOCUMENTS

| | | |
|---|---|---|
| CN | 2413875 Y | 1/2001 |
| CN | 101138466 A | 3/2008 |
| CN | 201101452 Y | 8/2008 |
| CN | 101579196 A | 11/2009 |
| CN | 203400059 U | 1/2014 |
| CN | 203619410 U | 6/2014 |
| CN | 203697084 U | 7/2014 |
| CN | 105072960 A | 11/2015 |
| CN | 204869075 U | 12/2015 |
| CN | 106880301 A | 6/2017 |
| CN | 107411590 A | 12/2017 |
| CN | 207532322 U | 6/2018 |
| CN | 208068418 U | 11/2018 |
| CN | 208481166 U | 2/2019 |
| CN | 110215131 A | 9/2019 |
| CN | 112515500 A | 3/2021 |
| CN | 214180183 U | 9/2021 |
| EP | 0116017 A1 | 8/1984 |
| EP | 100755 A2 | 2/1985 |
| EP | 2382902 A1 | 11/2011 |
| EP | 2382904 A1 | 11/2011 |
| EP | 2599415 A2 | 6/2013 |
| EP | 2677904 A1 | 1/2014 |
| EP | 2727504 A1 | 5/2014 |
| EP | 2958471 A1 | 12/2015 |
| GB | 2076638 A | 12/1981 |
| JP | H01153123 A | 6/1989 |
| WO | 2014/128435 A1 | 8/2014 |

* cited by examiner

ADJUSTABLE BLADE ASSEMBLY FOR A FOOD PROCESSOR

FIELD

This disclosure relates generally to motorized food processors and, more particularly, to an adjustable blade assembly for use with food processors.

BACKGROUND

Consumers commonly use food processors for blending, cutting, and dicing food products in a wide variety of settings, including home kitchen use, professional restaurant or food services use, and large-scale industrial use. Food processors offer a convenient alternative to chopping or dicing by hand, and often come with a range of operational settings and modes adapted to provide specific types or amounts of food processing catered to particular food products. Current food processors often include a feed chute for introducing food into the food processor for cutting by the internal slicing blades. Many consumers prefer the ability to adjust the slicing blade settings to produce thicker or thinner slices of food without needing to change to a different slicing blade. Consumers, moreover, prefer a simple and robust mechanism for effecting the adjustment of the slicing blade while providing tactile feedback to the user.

SUMMARY

This disclosure describes embodiments of an adjustable blade assembly for adjusting a thickness of a sliced food that also provides tactile feedback to the user. The assembly may include a threaded hub coupleable to a drive shaft of a food processor and a slicing plate slidably mounted on the hub. A slicing blade may couple to the hub above a first surface of the slicing plate for cutting food introduced into the food processor. A cannulated support collar may couple to the hub and include a plurality of detents. A slicing adjustment sleeve may rotatably couple to the hub and to the support collar to move the slicing plate up and down relative to the hub, thus changing a selected distance between the slicing plate and the slicing blade. As the user rotates the slicing adjustment sleeve, a plunger housed inside the slicing adjustment sleeve may advantageously engage the plurality of detents on the support collar, thus providing tactile feedback to the user. The engagement between the plunger and the detents may also help maintain the slicing blade in the desired position relative to the slicing plate.

Embodiments of the adjustable blade assembly of this disclosure may include one or more of the following, in any suitable combination.

In embodiments, an adjustable blade assembly for a food processing system of this disclosure includes a hub coupleable to a drive shaft of a food processing system for rotation about a central axis. The hub has a non-threaded first portion and a threaded second portion. A slicing plate mounts on the non-threaded first portion of the hub for rotation about the central axis. A slicing blade couples to the hub above a first surface of the slicing plate for rotation about the central axis. A cannulated support collar couples to the non-threaded first portion of the hub below a second surface of the slicing plate such that the threaded second portion extends below the support collar. A circumference of a bottom surface of the support collar defines a plurality of detents. A sleeve defines a channel for receiving a portion of the support collar such that the plurality of detents extends into the sleeve. An inner surface of the channel has threads for rotatably coupling to the threaded second portion of the hub. Rotation of the sleeve about the hub changes a selected distance between the slicing plate and the slicing blade.

In further embodiments, an outer surface of the sleeve includes indicia corresponding to the selected distance between the slicing plate and the slicing blade. In embodiments, the assembly further includes a plunger disposed within the sleeve. Engagement of the plunger with the plurality of detents maintains the selected distance between the slicing plate and the slicing blade. In embodiments, when the sleeve is rotated about the hub, the engagement of plunger with the plurality of detents provides tactile feedback to the user. In embodiments, an inner surface of the sleeve defines a slot for housing the plunger. In embodiments, the food processing system further includes a base housing a motor, and the drive shaft is operably coupled to the motor. In embodiments, the food processing system further includes a container having a first end and a second end remote from the first end. The second end is configured to removeably couple to the base such that the drive shaft extends into the container. In embodiments, the slicing plate defines an aperture configured for passage of sliced food from the first surface of the slicing plate into a bowl of the container. In embodiments, the slicing blade is adjustable to lie in or below the aperture in a storage position and to overlay the aperture in a cutting position on the first surface of the slicing plate on a plane substantially parallel with the first surface of the slicing plate. In embodiments, a lower surface of the slicing blade includes a ramp for guiding the sliced food into the bowl of the container.

In embodiments, a method of changing a selected distance between a slicing plate and a slicing blade of a food processing system includes coupling a hub of an adjustable blade assembly to a drive shaft of the food processing system for rotation about a central axis. The hub has a non-threaded first portion and a threaded second portion. The adjustable blade assembly also includes a slicing plate mounted on the non-threaded first portion of the hub for rotation about the central axis, a slicing blade coupled to the hub above a first surface of the slicing plate for rotation about the central axis, and a cannulated support collar coupled to the non-threaded first portion of the hub below a second surface of the slicing plate such that the threaded second portion extends below the support collar. A circumference of the bottom surface of the support collar defining a plurality of detents. The adjustable blade assembly also includes a sleeve defining a channel for receiving a portion of the support collar such that the plurality of detents extends into the sleeve. An inner surface of the channel has threads for rotatably coupling to the threaded second portion of the hub. The method also includes rotating the sleeve about the hub to change a selected distance between the slicing plate and the slicing blade.

In further embodiments, an outer surface of the sleeve includes indicia corresponding to the selected distance between the slicing plate and the slicing blade. In embodiments, the assembly further includes a plunger disposed within the sleeve. Engagement of the plunger with the plurality of detents maintains the selected distance between the slicing plate and the slicing blade. In embodiments, when the sleeve is rotated about the hub, the engagement of the plunger with the plurality of detents provides tactile feedback to the user. In embodiments, an inner surface of the sleeve defines a slot for housing the plunger. In embodiments, the food processing system also includes a base housing a motor. The drive shaft is operably coupled to the motor. In embodiments, the food processing system further includes a container having a first end and a second end remote from the first end and the method further includes removeably coupling the second end of the container to the base such that the drive shaft extends into the container. In embodiments, the slicing plate defines an aperture configured for passage of sliced food materials from the first surface of the slicing plate into a bowl of the container. In embodiments, changing a selected distance between the slicing plate and the slicing blade includes adjusting the slicing blade between a storage position, in which the slicing blade lies in or below the aperture, and a cutting position, in which the slicing blade overlays the aperture on the first surface of the slicing plate on a plane substantially parallel with the first surface of the slicing plate. In embodiments, a lower surface of the slicing blade includes a ramp for guiding the sliced food materials into the bowl of the container.

A reading of the following detailed description and a review of the associated drawings will make apparent the advantages of these and other features. Both the foregoing general description and the following detailed description serve as an explanation only and do not restrict embodiments of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
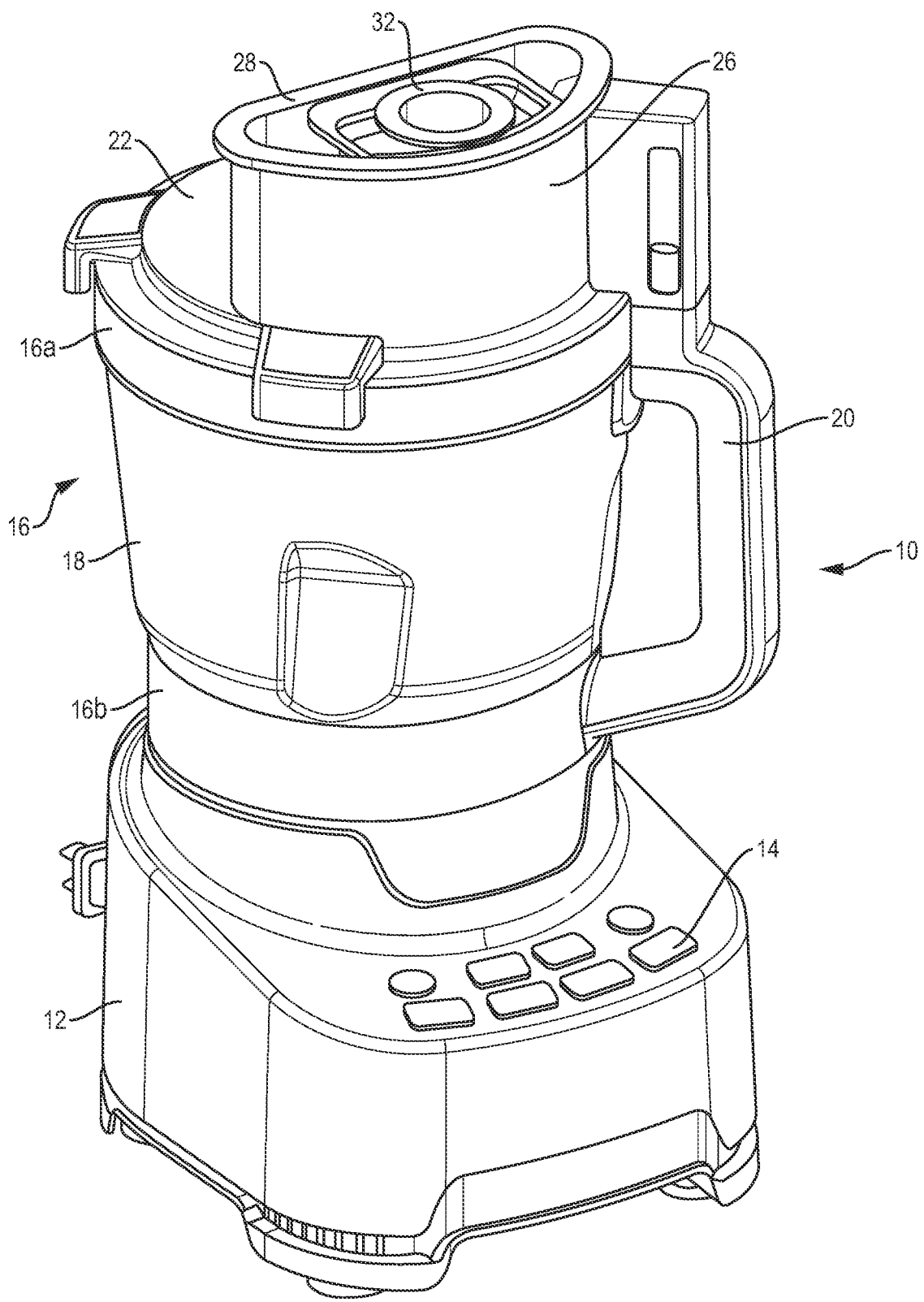
FIG. 1 is a perspective view of a food processor for use with the adjustable blade assembly according to some embodiments of this disclosure.

In the following description, like components have the same reference numerals, regardless of different illustrated embodiments. To illustrate embodiments clearly and concisely, the drawings may not necessarily reflect appropriate scale and may have certain features shown in somewhat schematic form. The disclosure may describe and/or illustrate features in one example, and in the same way or in a similar way in one or more other embodiments, and/or combined with or instead of the features of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "upper," "lower," "top," "bottom" and the like helps only in the clear description of the disclosure and does not limit the structure, positioning and/or operation of the feed chute assembly in any manner.

FIG. 1 shows an embodiment of a food processor 10 for use with the adjustable blade assembly 100 (FIG. 3C) of this disclosure. In embodiments, the food processor 10 may generally comprise a base 12 housing an internal motor (not shown), a plurality of user controls 14, and a container 16. The container 16 may further comprise a bowl 18 with a handle 20. A lid 22 may removeably couple to a first end 16a of the container 16 while a second end 16b of the container 16 may removeably couple to the base 12. The lid 22 may comprises an integral feed chute 26 for introducing food into the container 16. The feed chute 26 can receive a first pusher 28 for guiding the food toward a slicing blade (not shown) disposed near the first end 16a of the container 16. In embodiments, the pusher 28 can accommodate a smaller, second pusher 32.

Figure 2A:
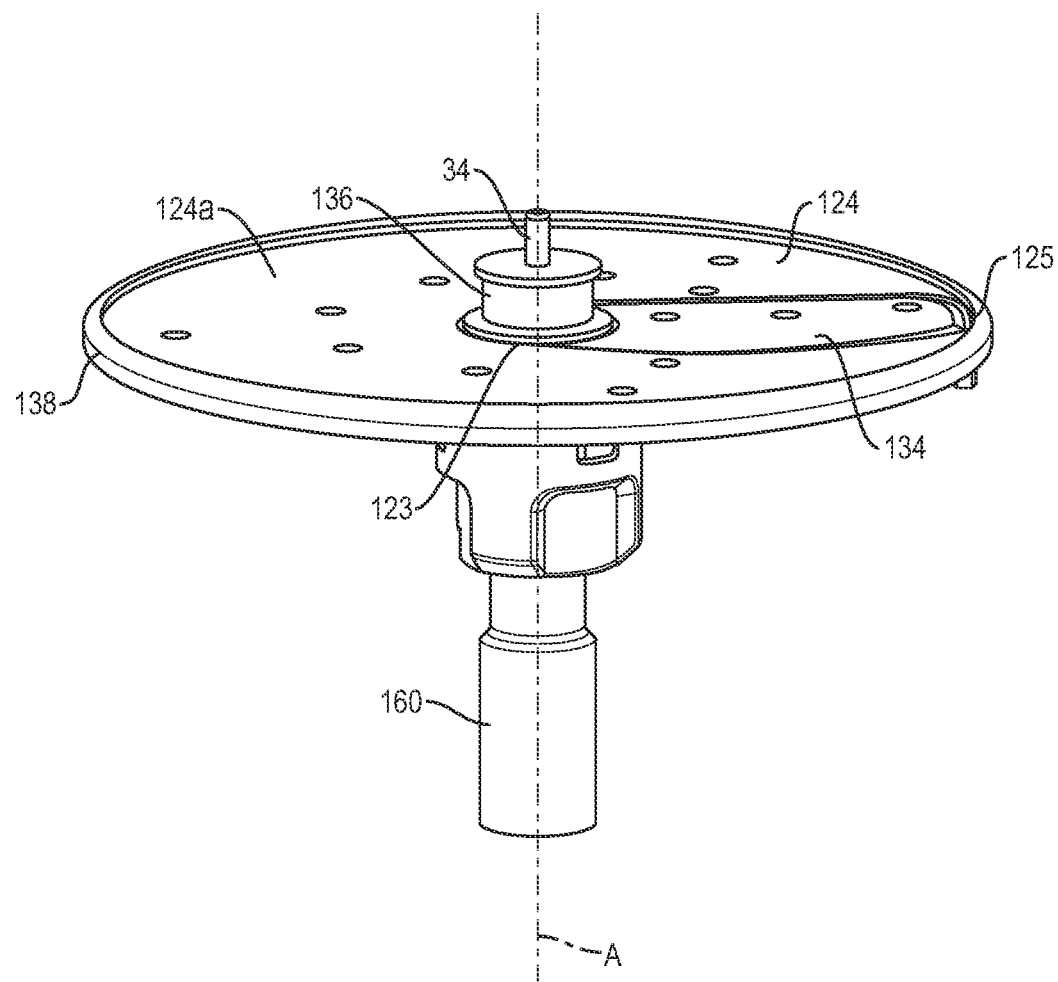
FIGS. 2A and 2B illustrate a slicing plate and slicing blade of the adjustable blade assembly according to some embodiments.
Figure 2B:
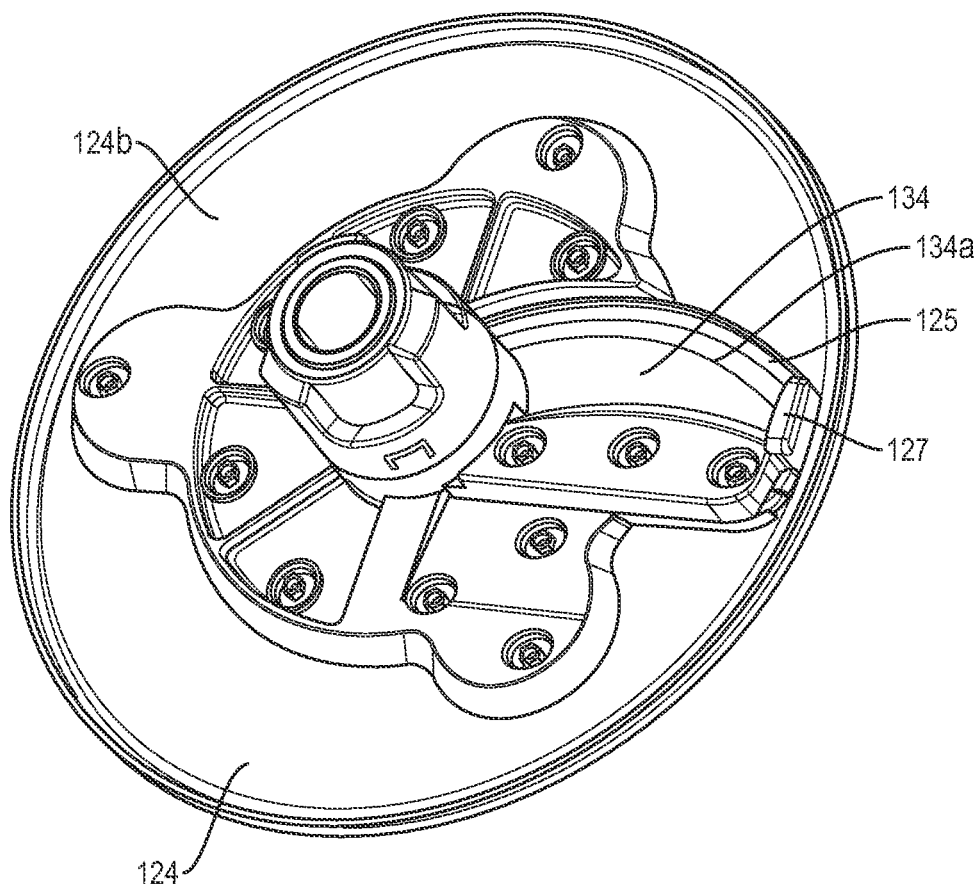

FIGS. 2A and 2B show an embodiment of a slicing plate 124 and slicing blade 134 of the adjustable blade assembly 100 of this disclosure. As shown in FIG. 2A, the slicing plate 124 may have an upper surface 124a and a lower surface 124b opposite the upper surface 124a. A circumference of the slicing plate 124 may be selected such that the slicing plate 124 forms a close fit within the container 16. The slicing plate 124 may define an aperture 125 configured for passage of sliced food from the upper surface 124a of the slicing plate 124 into the bowl 18 of the container 16. A slicing blade 134 may be coupled to a stud 136 surrounding a drive shaft and/or center spindle 34 at the upper surface 124a of the slicing plate 124 such that the slicing blade 134 does not rotate relative to the slicing plate 124—i.e., the slicing blade 134 and the slicing plate 124 may rotate concurrently. The slicing plate 124 may couple to a blade support hub 160. The blade support hub 160 may surround and/or engage with a portion of the drive shaft/center spindle 34 of the food processor 10 through a central opening 123 defined by the slicing plate 124 for rotation by the motor about a central axis A. The slicing blade 134 may be adapted to slice food in a direction substantially transverse to the central axis A. An annular wall 138 may extend about a periphery of the slicing plate 124 to control food contacting the slicing blade 134. The slicing blade 134 may be adjustable to lie in or below the aperture 125 in a storage position or to overlie the aperture 125 in a cutting position on a plane substantially parallel with the upper surface 124a of the slicing plate 124. By adjusting a distance between the slicing blade 134 and the slicing plate 124, a user can advantageously control a thickness of the food slice without the need for changing out the slicing plate 124 and the slicing blade 134.

As shown in FIG. 2B, in some implementations, a lower surface 134a of the slicing blade 134 may include a ramp 126 that extends downward through and/or adjacent the aperture 125 for guiding the sliced food into the bowl 18 of the container 16. The ramp 126 may be positioned laterally toward a back edge of the slicing blade 134. The ramp 126 may couple to the slicing blade 134 by a fastener such as, without limitation, one or more screws, rivets or clips, or glue. In some implementations, the ramp 126 may be integrally formed with the slicing blade 134. In some implementations, the slicing blade 134 and/or the ramp 126 may include a blade stop 127 configured to extend laterally away from the slicing blade 134 such that the blade stop 127 overlaps vertically with respect to slicing plate 124. Such a configuration may enable the blade stop 127 to engage with the bottom surface 124a of slicing plate 124 to prevent over travel of the slicing blade 134 and/or to prevent the slicing plate 124 from extending vertically above the slicing blade 134 when the adjustable blade assembly 100 is installed within the food processor 10.

Figure 3A:
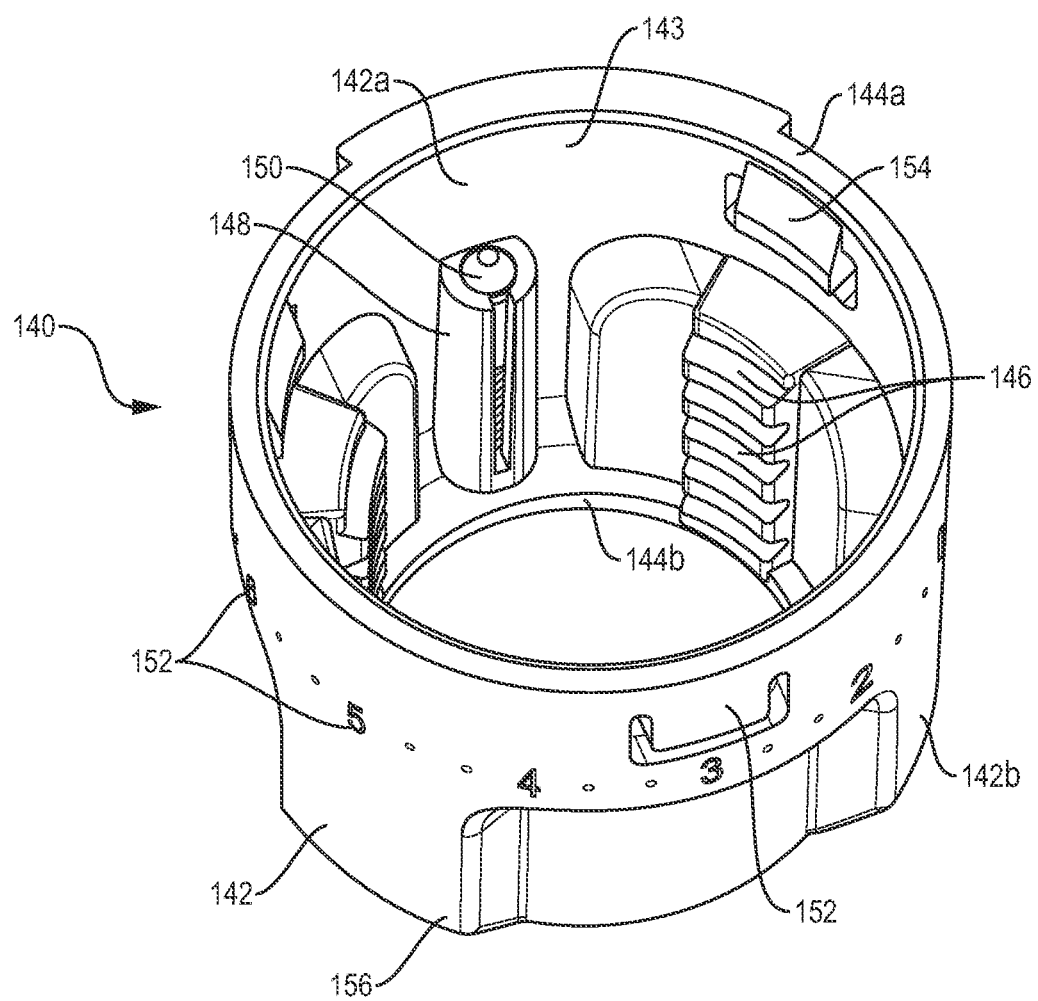
FIG. 3A illustrates a slicing adjustment sleeve of the adjustable blade assembly according to some embodiments.
Figure 3B:
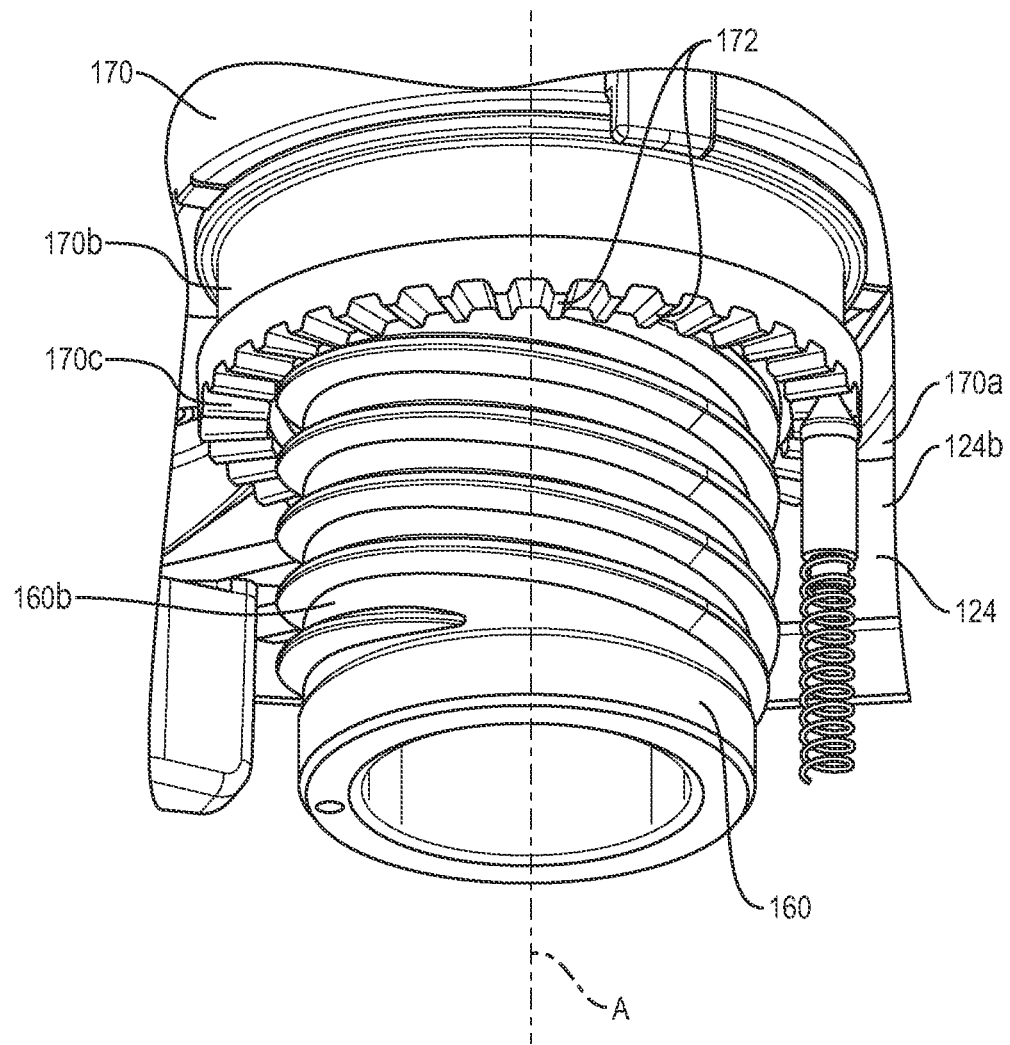
FIG. 3B illustrates a hub and support collar of the adjustable blade assembly according to some embodiments.
Figure 3C:
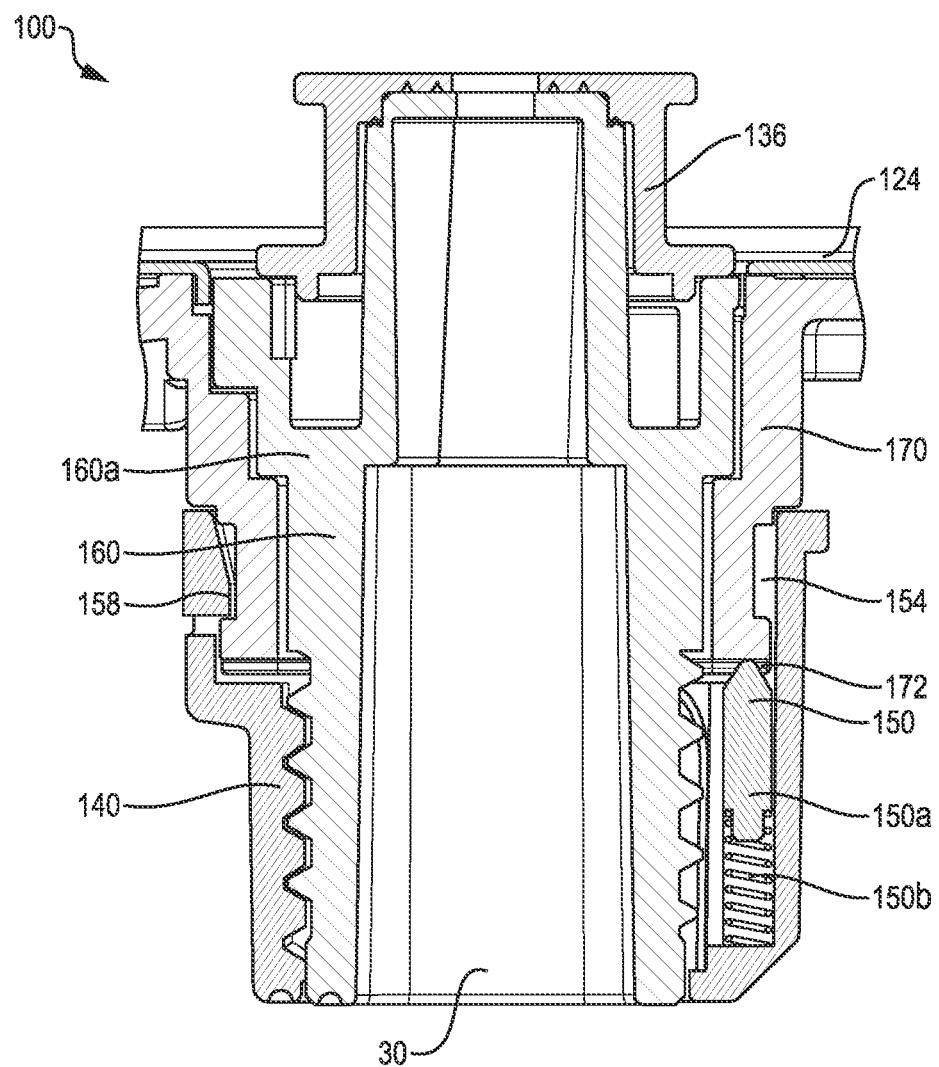
FIG. 3C is a cross-sectional, assembled view of the component parts of the adjustable blade assembly according to some embodiments.

FIGS. 3A-C shows embodiments of additional components of the adjustable blade assembly 100 of this disclosure. As shown in FIG. 3A, the assembly 100 may also include a cylindrical slicing adjustment sleeve 140 having a sidewall 142 defining a channel 143 that extends between a first open end 144a and a second open end 144b. An inner surface 142a of the sidewall 142 may comprise threads 146 and a vertical slot 148 for housing a spring-loaded plunger 150. An outer surface 142b of the sidewall 142 may have indicia 152 corresponding to a desired thickness of the food slice. Clips 154 in the sidewall 142 can aid in the assembly of the adjustable blade assembly 100. Ridges 156 on the outer surface 142b may advantageously provide an easy-grip surface to the user for rotating the slicing adjustment sleeve 140.

FIG. 3B shows an embodiment of a blade support hub 160 and a slicing plate support collar 170 for coupling to the slicing adjustment sleeve 140 of FIG. 3A. In one implementation, the slicing plate support collar 170 may fixedly couple to the slicing plate 124 while the blade support hub 160 may slidably couple to the slicing plate 124 through the central opening 123 (FIG. 2A) defined by the slicing plate 124. The blade support hub 160 may include a first non-threaded portion 160a (FIG. 3C) and a second threaded portion 160b. The slicing plate support collar 170 may include a first portion 170a extending radially outward from a second portion 170b along the lower surface 124b of the slicing plate 124. The second portion 170b of the slicing plate support collar 170 may be cannulated to receive the first non-threaded portion 160b of the blade support hub 160 such that the second threaded portion 160b extends from the second portion 170b. A circumference of a bottom surface 170c of the second portion 170b may include a plurality of detents 172. The slicing adjustment sleeve 140 of FIG. 3A may couple to the blade support hub 160 and to the second portion 170b of the slicing plate support collar 170 such that the plurality of detents 172 extend into the slicing adjustment sleeve 140. Meanwhile, the second threaded portion 160b of the blade support hub 160 may engage the threads 146 of the slicing adjustment sleeve 140 such that the user can rotate the slicing adjustment sleeve 140 about the second threaded portion 160b to move the slicing plate support collar 170 and the slicing plate 124 up and down relative to the slicing blade 134. This rotation in turn may change a distance between the slicing blade 134 and the slicing plate 124.

Figure 4A:
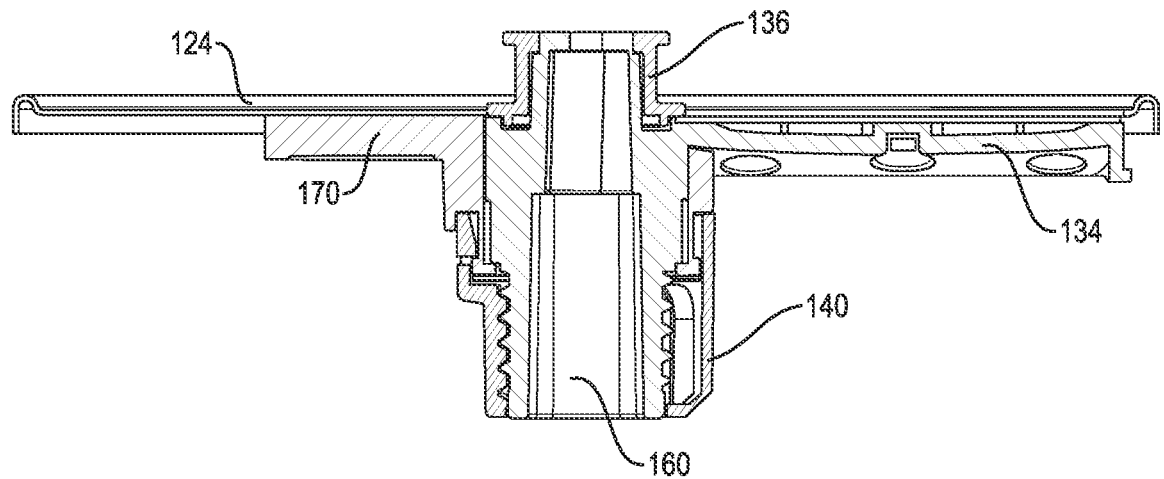
FIGS. 4A and 4B illustrate the relative position of the components of the adjustable blade assembly when the slicing blade is in the storage position (FIG. 4A) and when the slicing blade is in a cutting position (FIG. 4B) according to some embodiments.
Figure 4B:
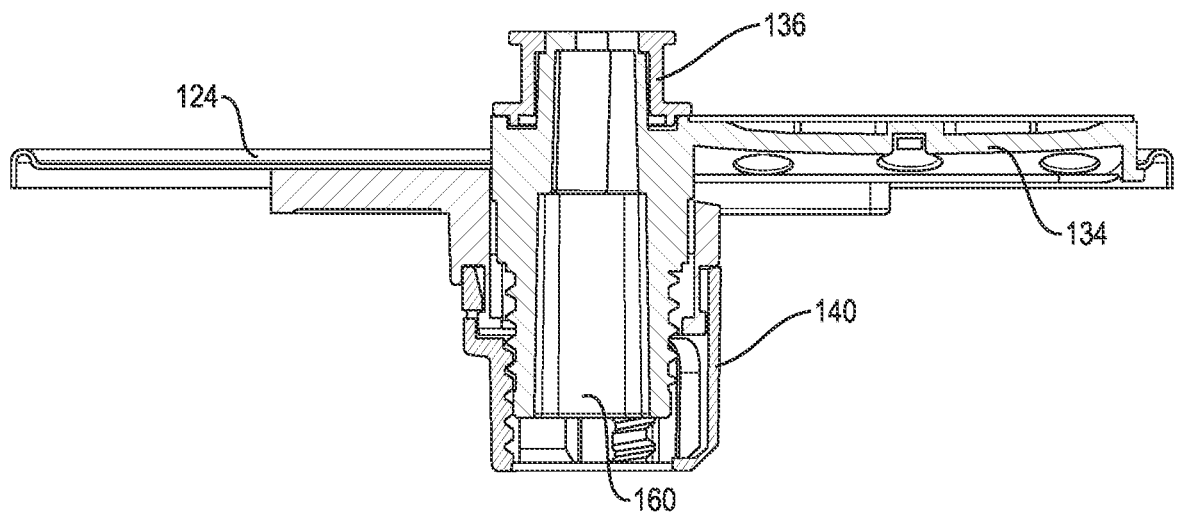

FIG. 3C illustrates a cross-section of embodiments of the component parts of the adjustable blade assembly 100 when fully assembled. In particular, FIG. 3C illustrates the relative positions of the stud 136, the slicing plate 124, the slicing adjustment sleeve 140, the plunger 150, the blade support hub 160, and the slicing plate support collar 170. The clips 154 of the slicing adjustment sleeve 140 can form a snap fit with indents 158 in the slicing plate support collar 170 to aid in the assembly of the adjustable blade assembly 100. As also shown in FIG. 3C, the plunger 150 may include a body 150a and a spring 150b. Thus, as the user rotates the slicing adjustment sleeve 140 about the blade support hub 160, the body 150a of the plunger 150 may engage the plurality of detents 172 to provide tactile feedback to the user and to help maintain the slicing blade 134 in the desired position relative to the slicing plate 124. FIGS. 4A and 4B illustrate the relative positions of the component parts when the slicing blade 134 is in the storage position (FIG. 4A) and in the cutting position (FIG. 4B). In particular, FIGS. 4A and 4B illustrate the relative positions of the stud 136, the slicing plate 124, the slicing blade 134, the slicing adjustment sleeve 140, the blade support hub 160, and the slicing plate support collar 170.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. An adjustable blade assembly for a food processing system comprising:
   a hub coupleable to a drive shaft of a food processing system for rotation about a central axis, the hub having a non-threaded first portion and a threaded second portion;
   a slicing plate mounted on the non-threaded first portion of the hub for rotation about the central axis;
   a slicing blade coupled to the hub above a first surface of the slicing plate for rotation about the central axis;
   a cannulated support collar coupled to the non-threaded first portion of the hub below a second surface of the slicing plate such that the threaded second portion extends below the support collar, a circumference of a bottom surface of the support collar defining a plurality of detents; and
   a sleeve defining a channel for receiving a portion of the support collar such that the plurality of detents extend into the sleeve, an inner surface of the channel having threads for rotatably coupling to the threaded second portion of the hub;
   wherein rotation of the sleeve about the hub changes a selected distance between the slicing plate and the slicing blade.

2. The adjustable blade assembly of claim 1, wherein an outer surface of the sleeve comprises indicia corresponding to the selected distance between the slicing plate and the slicing blade.

3. The adjustable blade assembly of claim 1, further comprising a plunger disposed within the sleeve, and wherein engagement of the plunger with the plurality of detents maintains the selected distance between the slicing plate and the slicing blade.

4. The adjustable blade assembly of claim 3, wherein, when the sleeve is rotated about the hub, the engagement of the plunger with the plurality of detents provides tactile feedback to the user.

5. The adjustable blade assembly of claim 3, wherein an inner surface of the sleeve defines a slot for housing the plunger.

6. The adjustable blade assembly of claim 1, wherein the food processing system further comprises a base housing a motor, and wherein the drive shaft is operably coupled to the motor.

7. The adjustable blade assembly of claim 1, wherein the food processing system further comprises a container having a first end and a second end remote from the first end, the second end configured to removeably couple to the base such that the drive shaft extends into the container.

8. The adjustable blade assembly of claim 7, wherein the slicing plate defines an aperture configured for passage of sliced food from the first surface of the slicing plate into a bowl of the container.

9. The adjustable blade assembly of claim 8, wherein the slicing blade is adjustable to lie in or below the aperture in a storage position and to overlay the aperture in a cutting position on the first surface of the slicing plate on a plane substantially parallel with the first surface of the slicing plate.

10. The adjustable blade assembly of claim 8, wherein a lower surface of the slicing blade includes a ramp for guiding the sliced food into the bowl of the container.

11. A method of changing a selected distance between a slicing plate and a slicing blade of a food processing system, the method comprising:
  coupling a hub of an adjustable blade assembly to a drive shaft of the food processing system for rotation about a central axis, the hub having a non-threaded first portion and a threaded second portion, the adjustable blade assembly further comprising:
    a slicing plate mounted on the non-threaded first portion of the hub for rotation about the central axis;
    a slicing blade coupled to the hub above a first surface of the slicing plate for rotation about the central axis;
    a cannulated support collar coupled to the non-threaded first portion of the hub below a second surface of the slicing plate such that the threaded second portion extends below the support collar, a circumference of the bottom surface of the support collar defining a plurality of detents; and
    a sleeve defining a channel for receiving a portion of the support collar such that the plurality of detents extend into the sleeve, an inner surface of the channel having threads for rotatably coupling to the threaded second portion of the hub;
  rotating the sleeve about the hub to change a selected distance between the slicing plate and the slicing blade.

12. The method of claim 11, wherein an outer surface of the sleeve comprises indicia corresponding to the selected distance between the slicing plate and the slicing blade.

13. The method of claim 11, wherein the adjustable blade assembly further comprises a plunger disposed within the sleeve; and wherein engagement of the plunger with the plurality of detents maintains the selected distance between the slicing plate and the slicing blade.

14. The method of claim 13, wherein, when the sleeve is rotated about the hub, the engagement of plunger with the plurality of detents provides tactile feedback to the user.

15. The method of claim 13, wherein an inner surface of the sleeve defines a slot for housing the plunger.

16. The method of claim 11, wherein the food processing system further comprises a base housing a motor, and wherein the drive shaft is operative coupled to the motor.

17. The method of claim 11, wherein the food processing system further comprises a container having a first end and a second end remote from the first end, and wherein the method further comprises removeably coupling the second end of the container to the base such that the drive shaft extends into the container.

18. The method of claim 17, wherein the slicing plate defines an aperture configured for passage of sliced food materials from the first surface of the slicing plate into a bowl of the container.

19. The method of claim 18, wherein changing a selected distance between the slicing plate and the slicing blade comprises adjusting the slicing blade between a storage position, in which the slicing blade lies in or below the aperture, and a cutting position, in which the slicing blade overlays the aperture on the first surface of the slicing plate on a plane substantially parallel with the first surface of the slicing plate.

20. The method of claim 18, wherein a lower surface of the slicing blade includes a ramp for guiding the sliced food materials into the bowl of the container.

* * * * *